Jan. 11, 1949.  F. F. CROOKE  2,458,930
MASTER SAFETY SWITCH
Filed April 17, 1947  2 Sheets-Sheet 1

Inventor,
FRED F. CROOKE,
By E. E. Vrooman & Co.,
Attorneys.

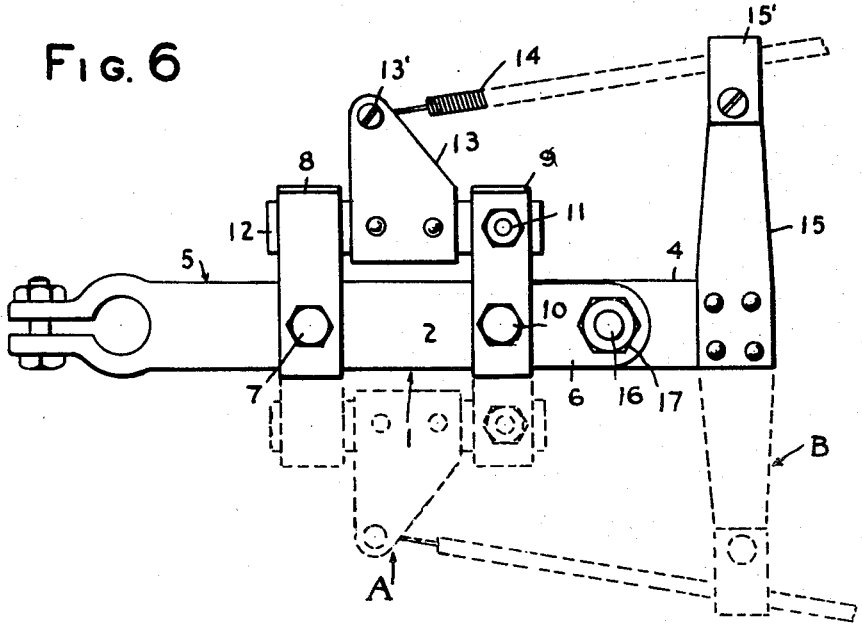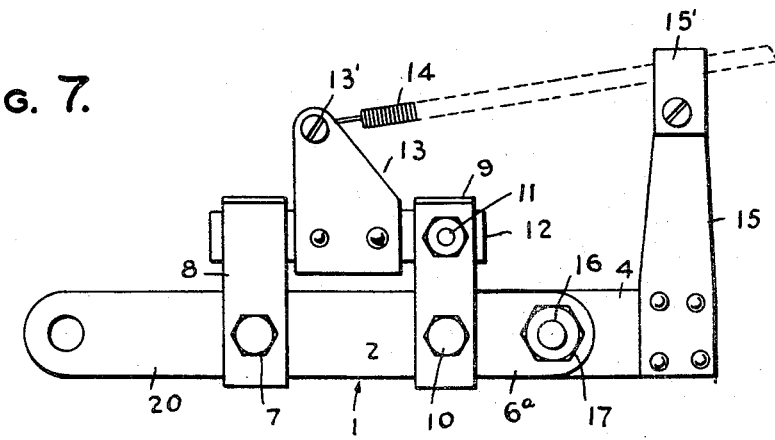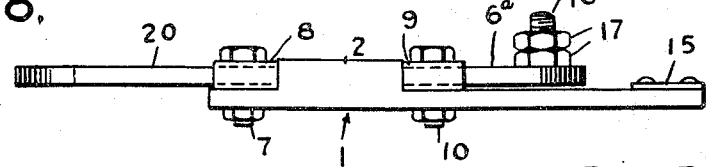

Patented Jan. 11, 1949

2,458,930

UNITED STATES PATENT OFFICE 2,458,930

MASTER SAFETY SWITCH

Fred Franklin Crooke, Jefferson City, Tenn.

Application April 17, 1947, Serial No. 742,023

1 Claim. (Cl. 200—52)

This invention relates to a master safety switch.

An object of the invention is the construction of a comparatively simple as well as highly efficient switch of a safety nature, particularly adapted for motor vehicles, and the like.

Another object of the invention is the novel construction of a switch especially designed as a protective device to safeguard against damage due to dangerous shorts in the electrical system.

A still further object of the invention is the provision of means for breaking the circuit right at the battery source of power, which is the equivalent of disconnecting of the battery terminals, whereby the entire electrical system is protected.

Another object of the invention is the construction of a novel and efficient switch that is connected to a battery terminal, and which switch is operated directly by hand in the case of an emergency, or when leaving the car, or may be operated directly by hand by mechanics making various adjustments and with the ignition turned on.

The constant vibration of a motor vehicle in motion, especially over rough roads, is sure to cause dangerous shorts in the wiring sooner or later unless it is all thoroughly secured and insulated.

With the foregoing and other objects in view, my invention comprises certain novel constructions, combinations, and arrangements of parts as will be hereinafter fully described, illustrated in the accompanying drawings, and more particularly pointed out in the appended claim.

In the drawings:

Fig. 1 is a top plan view of the vertical form or modification of a master safety switch constructed in accordance with this invention, while

Fig. 6 is a top plan view of the horizontal form or modification of the master safety switch, Fig. 7 is a top plan view of another embodiment of this invention, while Fig. 8 is a view in side elevation of the same.

Figure 1:
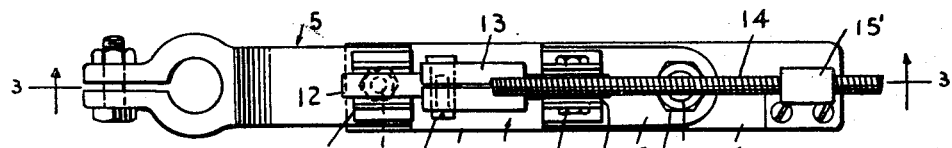
Figure 2:
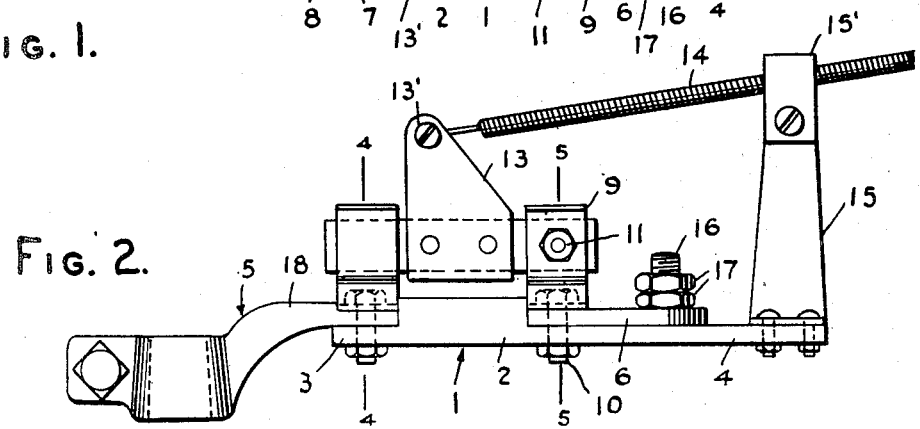
Fig. 2 is a view in side elevation.
Figure 3:
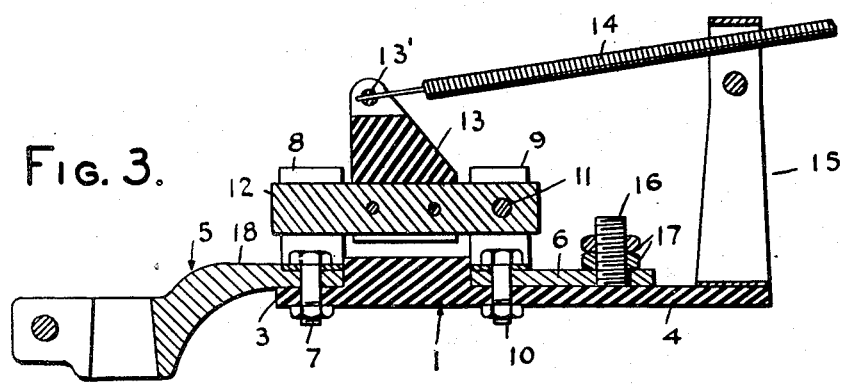
Fig. 3 is a longitudinal, vertical sectional view taken on line 3—3, Fig. 1, and looking in the direction of the arrows.
Figure 4:
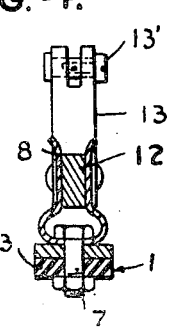
Fig. 4 is a transverse sectional view taken on line 4—4, Fig. 2.
Figure 5:
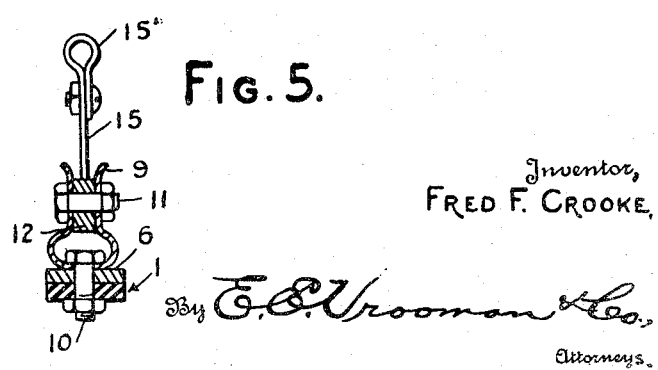
Fig. 5 is a transverse sectional view taken on line 5—5, Fig. 2.

Referring to the drawings, in Figs. 1 to 5 the preferred embodiment of this invention is illustrated. This embodiment is a vertical type of the master safety switch, comprising a switch base 1 that has a broad block center 2, and at the inner end of the center 2 is a stub portion 3, and at the outer end is an elongated portion 4. An angularly battery terminal shank 5 has its inner end resting upon the stub portion 3, with its extreme end engaging one side of the broad block center 2 as clearly seen in Fig. 2. A supplemental plate 6 is laid on the elongated portion 4. This flat supplemental plate 6 is not made of insulated material, while the switch base 1 is made of insulated material. The stub portion 3 and the inner end of the terminal shank 5 are secured together by means of a bolt and nut 7. Primary contact jaws 8 are secured by bolt 7 upon the inner end of the terminal shank 5. Auxiliary contact jaws 9 are secured by bolt 10 upon the supplemental plate 6. A bolt 11 extends through said auxiliary contact jaws 9, and upon bolt 11 is pivotally mounted blade 12. Blade 12 is adapted to be swung into contact with and out of contact with the primary contact jaws 8.

A control arm 13, preferably of triangular shape in general contour, is fixedly secured upon blade 12 between the jaws 8 and 9. A control cable 14 is fastened at its inner end in the outer end of the control arm 13; this fastening is accomplished by screw 13'. The control cable 14 passes through eye 15' of the cable guide 15. The control cable 14 preferably extends to the dash or instrument board of the motor vehicle and is operated by the driver of the vehicle.

A terminal bolt 16 is on the supplemental plate 6, to which bolt 16 a wire or cable may be attached; the attachment is accomplished by the lock nuts 17 on bolt 16. The supplemental plate 6 fits snugly at its inner end against one side or end of the broad block center 2.

The battery terminal 5 is curved upwardly or outwardly at 18, whereby the main part of the switch is spaced from the battery, keeping the switch clean and from acid of the battery contacting the same.

In the embodiment shown in Fig. 6, the switch base 1 is the same in construction as illustrated and described for the embodiment in Figs. 1 to 5. Also the battery terminal shank 5 is the same, as well as supplemental plate 6. In this horizontal form of the switch, the primary and auxiliary contact jaws 8 and 9 straddle the base structure to place these jaws in a horizontal position. Bolt 7 holds the primary jaws 8 in position, while bolt 10 holds the auxiliary jaws likewise in position. The other parts of this modification are the same in appearance and operation as the similar parts illustrated and described in Figs. 1 to 5. If desired to place the jaws 8 and 9 in the position shown in dotted line at A, Fig. 6, all that is necessary is to remove the bolts 7 and 10, reverse the position of jaws 8 and 9, and then insert the bolts and the reverse position will be obtained. Of course, the fastening means at 19 will have to be temporarily removed while the cable guide 16 is being changed to the position shown by dotted lines at B, then these fastening means 19 can be reinserted to hold the cable guide 16 in its new position.

In the embodiment shown in Figs. 7 and 8, a terminal plate 20 is employed in place of the terminal shank 5. The connection of the terminal plate to the switch base 1 is the same as described for the other embodiments. In this embodiment, the primary contact jaws 8 straddle the inner end of the terminal plate 20 with bolt 7 extending therethrough. Likewise, auxiliary contact jaws 9 straddle the inner end of supplemental plate 6a with bolt 10 extending therethrough. The other parts of this embodiment are the same as in the described Figs. 1 to 6.

It will be understood that the switch base 1 and the control arm 13 is preferably made out of hard rubber of acid resistant material, especially when the switch is mounted directly on the battery post. However, terminal plate 20 (Figs. 7 and 8) may be used instead of the angular terminal shank 5. As shown this terminal plate 20 has one square end that connects to the switch base, and the other round end is grounded to the frame of the vehicle, or mounted on the starter cable bolt to act as a switch between the battery and the starter. In other words, this allows the master safety switch to be used in four different positions, as at either end of the positive or negative battery cables. Thus, if space is restricted at one point on the vehicle, it may be mounted and used in one of the other three and still protect the entire circuit of the vehicle.

It is to be noted that the contact jaws 8, as well as contact jaws 9, are made each in one piece.

The cable guide 15 is very useful when the switch is to be operated from the dash. The control arm or cable 14 may be operated directly by hand if desired by workmen and mechanics making various adjustments, without having to go around and turn the ignition off or on.

It is to be understood that even though the structure as illustrated may appear light in weight, each part is to be made heavy enough to serve the purpose for which it is intended. The current-carrying members especially are to be made heavy and strong enough to easily carry the maximum current load to which they will be subjected.

From the foregoing, it will be understood that this switch is easily convertible from a vertical type to a horizontal type. The adjustment can be easily accomplished by removing a few bolts, rearranging the parts, and then replacing the bolts to secure the parts in their new adjusted position; this is especially true of the embodiments shown in Figs. 1 to 6. In the embodiment shown in Figs. 7 and 8, the positioning of the primary contact jaws 8 and the auxiliary jaws 9 in their straddling positions upon the terminal plate 20 and the supplemental plate 6a is somewhat different than the positioning of the same jaws in the other two embodiments. However, the useful and novel switch base 1 is the same in specific structure in all three embodiments.

It is to be understood that even though a control cable 14 is shown as one means for operating the master safety switch, a push-pull rod (not shown) or other means may be employed in its operation. Further, while the guide 15 is shown attached to the top of portion 4, it may be secured to the bottom or under face of portion 4.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a master safety switch, the combination of a horizontal plate-like switch base formed of insulating material and comprising a broad upstanding block center, said block center having at one end an integral horizontal flat stub portion below the top face of said block center, said block center having at another end an integral horizontal elongated flat portion below the top face of said block center, a horizontal elongated terminal member curved vertically throughout part of its length and having its inner end resting flat on said stub portion, said terminal member having its inner end bearing against a side portion of said block center, detachable means fastening said terminal member and said stub portion together, a horizontal supplemental plate resting on top of said elongated flat portion, fastening means detachably connecting said supplemental plate and elongated portion together, a terminal bolt extending through said supplemental plate, said terminal bolt having its inner end resting against the top face of said elongated portion, nuts on said terminal bolt above said supplemental plate, a contact jaw mounted on said terminal plate, a contact jaw mounted on said terminal member, and a switch blade pivotally mounted on one of said jaws and being adapted to engage the other jaw, substantially as shown and described.

FRED FRANKLIN CROOKE.

REFERENCES CITED

The following references are of record in the file of this patent:

UNITED STATES PATENTS

| Number | Name | Date |
|---|---|---|
| 1,615,106 | Bethea | Jan. 18, 1927 |
| 1,839,916 | Ehrlich | Jan. 5, 1932 |
| 1,995,946 | Schild | Mar. 26, 1935 |
| 2,104,689 | Barker et al. | Jan. 4, 1938 |
| 2,277,671 | Williams et al. | Mar. 31, 1942 |

FOREIGN PATENTS

| Number | Country | Date |
|---|---|---|
| 386,426 | Great Britain | Jan. 19, 1933 |